United States Patent [19]
Reed

[11] Patent Number: 5,313,065
[45] Date of Patent: May 17, 1994

[54] FIBER OPTIC RADIATION MONITOR

[75] Inventor: Stuart E. Reed, Homeworth, Ohio

[73] Assignee: The Babcock & Wilcox Company, New Orleans, La.

[21] Appl. No.: 938,722

[22] Filed: Sep. 1, 1992

[51] Int. Cl.$^5$ .......................... G01T 1/20; G01T 1/203
[52] U.S. Cl. ...................................... 250/368; 250/367
[58] Field of Search .................. 250/253, 361 C, 362, 250/368, 367, 252.1, 370.11, 390.11, 485.1, 486.1, 487.1, 267

[56] References Cited

U.S. PATENT DOCUMENTS

| | | |
|---|---|---|
| 4,267,446 | 5/1981 | Brown et al. ......................... 250/367 |
| 4,361,765 | 11/1982 | Franks et al. ...................... 250/486.1 |
| 4,598,202 | 7/1986 | Koechner ......................... 250/368 X |
| 4,788,436 | 11/1988 | Koechner ......................... 250/368 X |
| 4,931,646 | 6/1990 | Koechner ......................... 250/368 X |

FOREIGN PATENT DOCUMENTS

| | | |
|---|---|---|
| 2163252 | 2/1986 | European Pat. Off. ............ 250/368 |
| 63-307382 | 12/1988 | Japan ................................. 250/368 |
| 2-74890 | 3/1990 | Japan ................................. 250/367 |

OTHER PUBLICATIONS

Chiles et al., 'Multi-Energy Nuetron Detector for Counting Thermal Neutrons, High-Energy Neutrons, and Gamma Photons Separately', IEEE Transactions on Nuclear Science, vol. 37, No. 3, Jun. 1990, pp. 1348-1350, USCL 250/390.11

Kozlov et al, 'A Scintillator Based on Hexafluorobenzene'; Plenum Publishing Corp., 1975, pp. 737-739, USCL 250/486.1.

Technical Proposal, "Development of a Long Term Post Closure Radiation Monitor" USDOE, Dec. 13, 1991.

Bicron Corp. Sales Brochure BCF-28 "Green Plastic Scintillating Fiber" Nov., 1990.

Primary Examiner—Constantine Hannaher
Assistant Examiner—Edward J. Glick
Attorney, Agent, or Firm—Daniel S. Kalka; Robert J. Edwards

[57] ABSTRACT

Scintillating optical fiber is used in a probe for detecting radiation. The scintillating optical fiber is fused to an extension fiber leading to optoelectronics such as p-intrinsic n-photodiodes or avalanche photodiodes. The fibers are housed in a durable probe body for penetration into the ground. When radiation is present, dopants in the scintillating fiber emit visible light through the extension fiber to the optoelectronics. Amplifiers are provided for monitoring the light intensity transmitted along the fibers and for triggering an alarm circuit signaling the presence of radiation at the probe.

7 Claims, 4 Drawing Sheets

FIBER OPTIC RADIATION MONITOR

BACKGROUND OF THE INVENTION

1. Field of the Invention

The present invention relates in general to the monitoring of nuclear waste, and in particular to a new and useful radiation detector using scintillating optical fiber.

2. Description of the Related Art

Monitoring of sites where high or low level nuclear wastes or nuclear materials are stored is becoming increasingly common. Due to the questionable integrity of storage containers, the frequent monitoring of soil and ground water at such sites is required. These monitoring methods usually involve drilling one or more test wells, and then instrumenting the test wells with laboratory radiation detection equipment adapted for field use, such as scintillation chambers and photomultiplier tubes. Drilling of the test wells is expensive and introduces the potential for cross-contamination of geological strata. The instrumentation after adaptation for drilling is expensive and requires high voltage lines for operation in the well, and thus is not generally suitable for applications requiring a large number of monitoring locations.

The use of optical fiber bundles to transmit light from scintillators to photomultiplier tubes is known in the art. This method is often used when the local environment at the scintillator location is too hostile for direct installation of the photomultipliers. Recently, optical fibers have been developed which incorporate scintillating dopants in the fiber structure. These fibers are sensitive to the same particles and types of radiation as conventional scintillators, and are used primarily as imaging detectors in radiographic systems for replacing phosphor screens and in detection applications such as neutron long counters.

SUMMARY OF THE INVENTION

The present invention provides a radiation monitoring apparatus and method which is relatively low in cost by minimizing installation costs in order to permit a large number of monitors to be installed for performing site surveys and monitoring. The present invention can be installed when the radiation materials are initially stored in order to provide early warning of possible loss of the integrity of the storage containers.

The present invention comprises a section of scintillating optical fiber used in a probe for use as a radiation detector. This optical fiber is coupled by fusion or other means to a low cost extension fiber, such as plastic clad silica (PCS), of sufficient length to reach the surface of the site and conventional optoelectronics. The fibers are enclosed in a rugged probe body or ground penetrator for protection purposes. If radiation is present, the radiation contacts the scintillating fiber thereby causing the dopants in the fiber to emit light in the visible range which is conducted to the optoelectronics by the extension fiber. The detectors used in the present invention are low cost silicon p-intrinsic-n photodiodes (PIN photodiodes) or APD's (avalanche photodiodes) with appropriate amplification which monitor the light intensity or number of single photon events transmitted through the fiber.

The present invention is a radiation sensor that is completely passive and self-generating. It is inherently simple, rugged and reliable, and thus suitable for use in a driven ground penetrator. Thus, radiation ground monitoring can be performed without incurring the high cost of drilling wells, thereby permitting more extensive monitoring. Due to the ruggedness and simplicity of the present invention, minimal maintenance is required resulting in an extended life.

Because the present invention requires that only detection electronics be used, minimal power is consumed and this allows the present invention to be powered by such sources as a battery or solar power, allowing for monitoring at remote sites.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
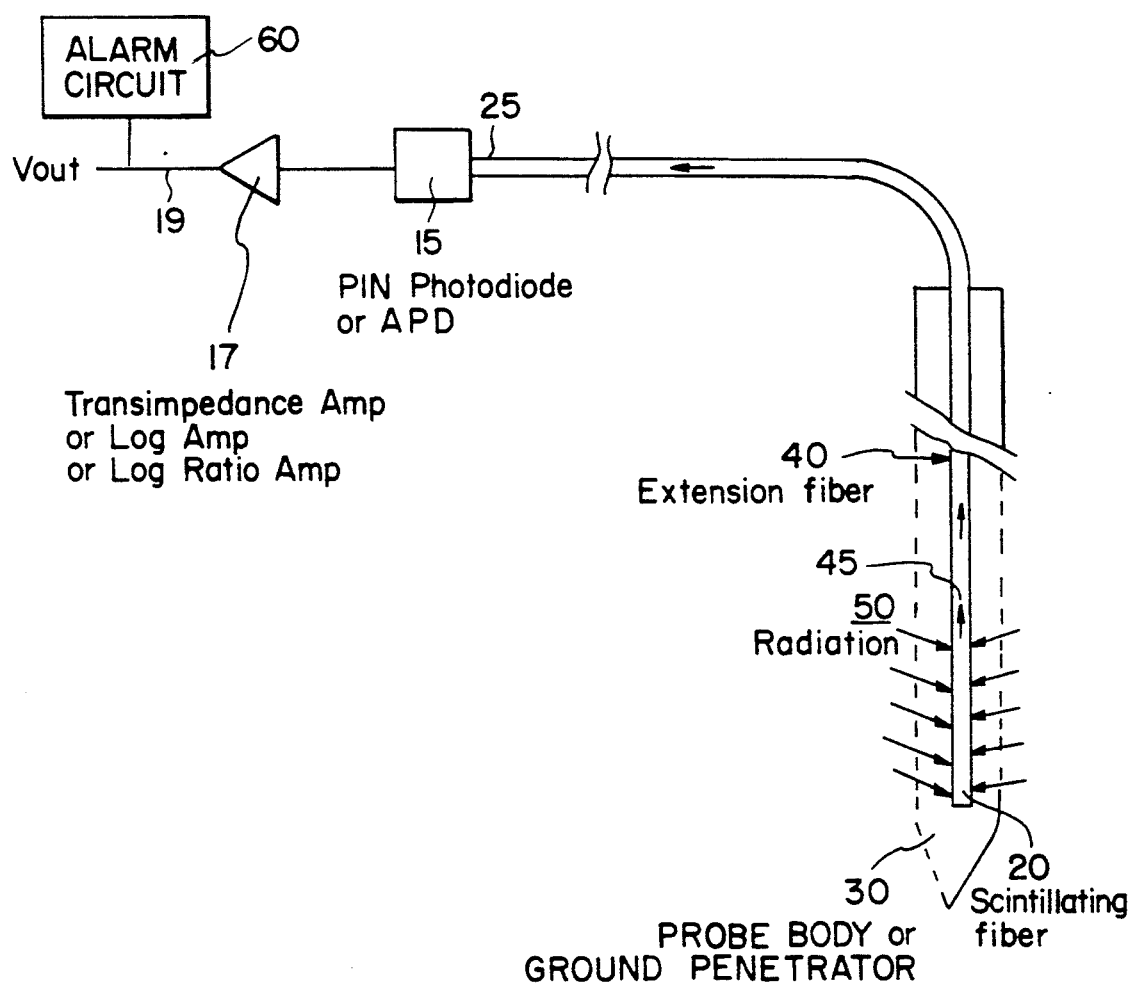
FIG. 1 is a schematic representation of the present invention.

Referring to FIG. 1, the invention embodied therein comprises a scintillating optical fiber 20 for detecting radiation 50. The scintillating fiber 20 is joined to an extension fiber 40 at a connection junction 45 wherein both fibers 20 and 40 are housed in a probe body or ground penetrator 30 made of a durable material for penetrating into the ground.

The extension fiber 40 can be plastic clad silica (PCS) and is extended and joined to a photodetector or sensor 15 at a detector connection point 25. The detector 15 can be a conventional optoelectronic such as a p-intrinsic-n photodiode (PIN) photodiode or an avalanche photodiode (ADP).

When radiation 50 is present at the scintillating fiber 20, dopants in the fiber 20 emit visible light through the extension fiber 40 to the detector 15 which in turn is amplified by an amplifier 17 such as a transimpedance, log or log ratio amplifier provided at the detector 15.

Output voltage, Vout 19 exits the amplifier 17 and is picked up by an alarm circuit 60 for signaling the presence of radiation 50 sensed at the scintillating fiber 20.

The length of the scintillating fiber 20 dictates which portion of the probe 30 is sensitive to radiation, thus providing spatial resolution in the vertical direction. Multiple channels could be incorporated in a single ground penetrator 30 in order to provide the capability for monitoring in more than one zone at a single site location, or for vertical profiling.

Probe sensitivity to various types of radiations is determined by the design of the probe body 30 in the area of the scintillating fiber 20 and the cross-section of the scintillating fiber 20. The design of the probe 30 and the selection of the scintillating fiber 20 can be tailored to a particular monitoring scenario and can be used to provide discrimination against natural background radiation, such as that encountered in some clays.

Figure 3:
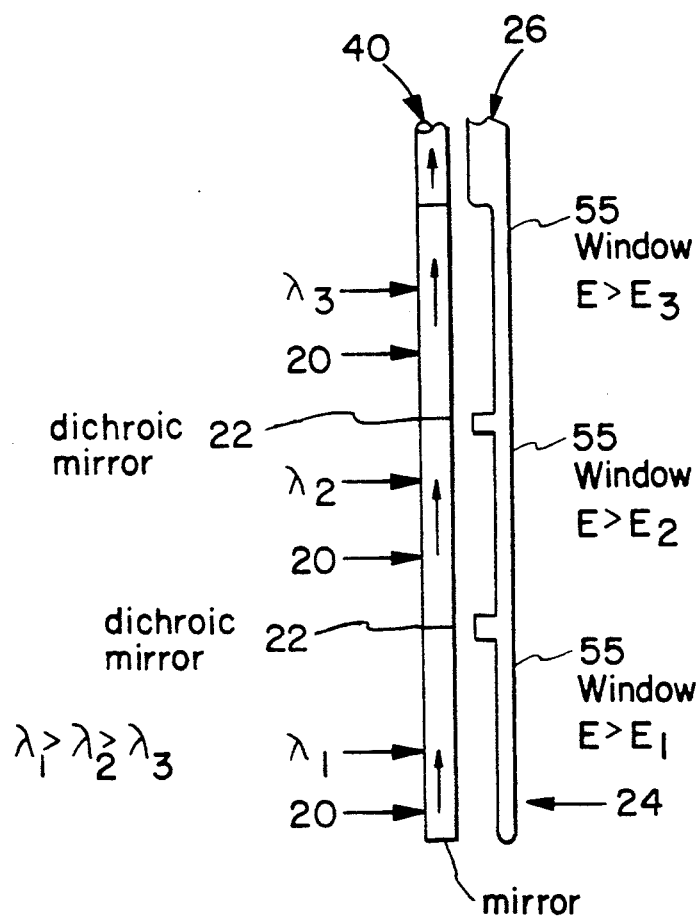
FIG. 3 is a partial view of the scintillating fiber of FIG. 2.

FIG. 3 illustrates that the probe 30 can be tailored to provide quantitative energy discrimination. Scintillating fibers 20 which scintillate at different wavelengths $\lambda_1, \lambda_2, \lambda_3 \ldots \lambda_n$ are used within the probe 30. The fibers 20 can be arranged in order of wavelength with the fiber 20 emitting the longest wavelength $\lambda$ located at the bottom 24 of the probe 30 followed by the fibers 20 emitting successively shorter emission wavelengths $\lambda_2, \lambda_3 \ldots \lambda_n$ with the top fiber 20 connected to extension fiber 40 at the top 26 of the sensing section of probe 30.

The scintillating fiber sections 20 are separated by dichroic mirrors 22 which pass the longer wavelengths from below but reflect the shorter wavelengths from above. Selection of the radiation type and energy threshold for each fiber section 20 is accomplished by providing windows 55 in the probe 30. The windows 55 are aligned with a corresponding section 20 said windows 55 may have the ability to be opened and closed such that when opened a selected radiation 50 enters the probe 30 and contacts the corresponding section 20. When closed the specific radiation 50 is prevented from entering the probe 30, and the window aperture is physically protected.

Figure 2:
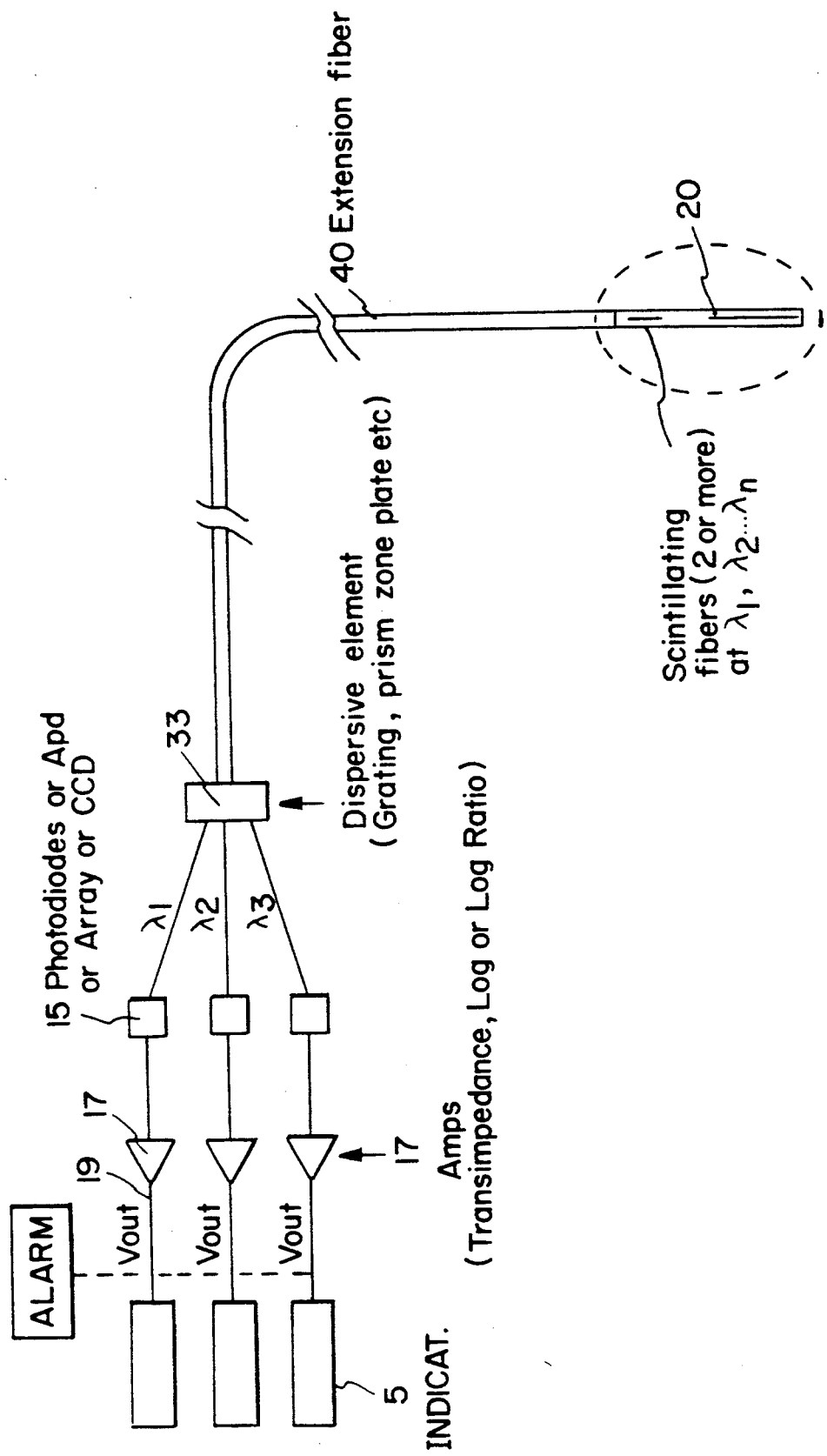
FIG. 2 is a view similar to FIG. 1 showing another embodiment of the present invention providing for qualitative energy discrimination.

FIG. 2 illustrates that the light from all of the scintillating fibers 20 is transmitted to the optoelectronics which is located at the surface through a single extension fiber 40 where it is spectrally dispersed by a dispersive element 33 and each channel is measured individually by a plurality of detectors 15, amplifiers 17 and indicators 5.

Figure 4:
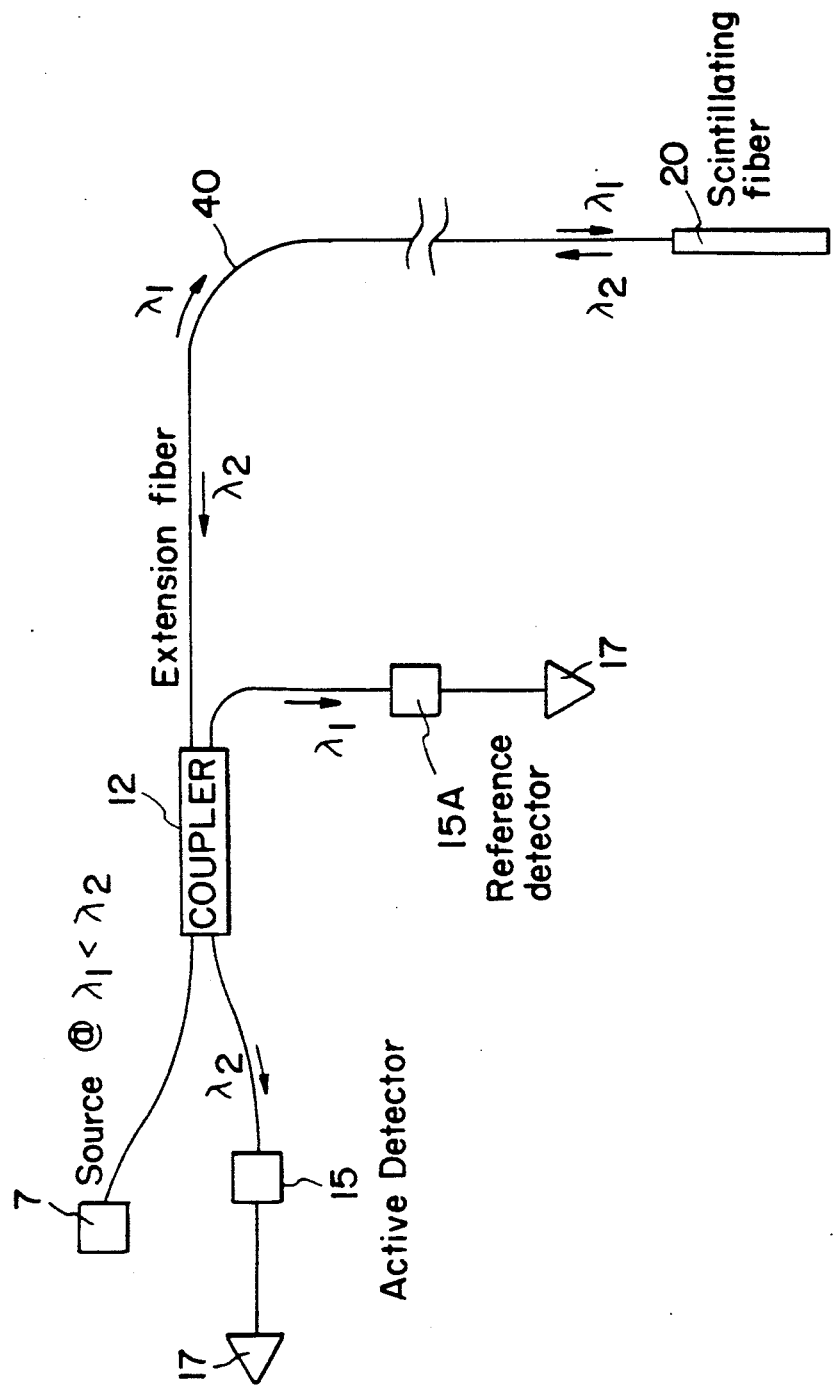
FIG. 4 is a view similar to FIG. 1 showing another embodiment of the present invention.

For applications where the present invention is installed for long periods of time, it is desirable to periodically verify the operability and sensitivity of the monitor. FIG. 4 shows how such a test is performed through the use of an optical source 7, such as an LED or laser diode with a wavelength suitable for excitation of the scintillator 20. An optical coupler 12 is provided at the source 7 and is used to transmit light through the extension fiber 40 to the scintillating fiber 20. The scintillating fiber 20 is excited by this light having wavelength $\lambda_1$, and emits at its own characteristic wavelength $\lambda_2$. This wavelength $\lambda_2$ signal is detected at the optoelectronics 15, thus verifying the operability of the monitor. By adding a second photodetector 15A to monitor the brightness of the optical source 7, and some additional signal processing, the ratio of the returned signal $\lambda_2$ to the launched signal $\lambda_1$ can be calculated to provide a measure of the sensitivity of the monitor and to show that the sensor calibration has not changed.

While specific embodiments of the invention have been shown and described in detail to illustrate the application of the principles of the invention, it will be understood that the invention may be embodied otherwise without departing from such principles. For example, the probe could contain a cavity filled with a scintillating fluid such as BC-505 or BC-519 (Bicron Corp., Newburg, Ohio) instead of a scintillating fiber. The needed optical confinement could be provided by mirror coatings on the inside of the cavity, or by lining the cavity with a material such as acrylic plastic with an index of refraction different from that of the scintillating fluid to produce a condition of total internal reflection at the interface between the fluid and the liner. The extension fiber would then be placed in optical contact with the fluid to receive the light generated in the fluid as a result of exposure to radiation.

What is claimed is:

1. A sensor for detecting the presence of underground radiation, comprising:
   a probe for penetrating an underground area of possible radiation;
   a scintillating optical fiber housed within the probe for emitting light when exposed to radiation at the underground area, said scintillating optical fiber having a plurality of sections housed within the probe, each section of the scintillating optical fiber emitting a different wavelength corresponding to a selected radiation, said probe being provided with a plurality of windows such that each window is aligned with a corresponding section of the scintillating optical fiber, said windows providing energy discrimination;
   a non-scintillating extension fiber having one end connected to the scintillating optical fiber for passing light emitted by the scintillating optical fiber;
   photodetection means operatively connected to an opposite end of the extension fiber for receiving emitted light originating from the scintillating optical fiber and passed through the extension fiber, the photodetection means being for converting the light into a signal; and
   electronic means for receiving the signal from the photodetection means and for indicating the presence of radiation at the underground area.

2. The sensor according to claim 1, wherein the photodetection means comprises a p-intrinsic-n photodiode.

3. The sensor according to claim 1, wherein the photodetection means comprises an avalanche photodiode.

4. The sensor according to claim 1, wherein the probe has a top and a bottom, the top located at the extension fiber, the bottom located at an opposite end of the scintillating optical fiber.

5. The sensor according to claim 1, wherein each section of the scintillating optical fiber is arranged in order of increasing emitting wavelength such that the section with the shortest emitting wavelength is positioned at an end of the probe nearest the extension fiber and the section with the longest emitting wavelength is positioned at an end of the probe furthest from the extension fiber.

6. The sensor according to claim 5, wherein a dichroic mirror is provided between each section of the scintillating optical fiber, each dichroic mirror having spectral characteristics such that it reflects the wavelength emitted by the adjacent section nearer to the extension fiber and passes the longer wavelength emitted by the adjacent section further from the extension fiber.

7. The sensor according to claim 1, including light dispersive means connected to the extension fiber for receiving various emitted wavelengths of light and for dispersing each emitted wavelength of light to a corresponding photodetection means.

* * * * *